(12) United States Patent
Tada et al.

(10) Patent No.: US 10,732,104 B2
(45) Date of Patent: Aug. 4, 2020

(54) MEASURING CHIP, MEASURING DEVICE AND MEASURING METHOD

(71) Applicant: FURUNO ELECTRIC CO., LTD., Nishinomiya (JP)

(72) Inventors: Keiji Tada, Kobe (JP); Jun Yamabayashi, Kobe (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 101 days.

(21) Appl. No.: 15/742,220

(22) PCT Filed: Jun. 7, 2016

(86) PCT No.: PCT/JP2016/066817
§ 371 (c)(1),
(2) Date: Jan. 5, 2018

(87) PCT Pub. No.: WO2017/006679
PCT Pub. Date: Jan. 12, 2017

(65) Prior Publication Data
US 2018/0202930 A1 Jul. 19, 2018

(30) Foreign Application Priority Data
Jul. 7, 2015 (JP) .................................. 2015-136318

(51) Int. Cl.
*G01N 21/77* (2006.01)
*G01N 21/552* (2014.01)
*G01N 21/27* (2006.01)

(52) U.S. Cl.
CPC ......... *G01N 21/552* (2013.01); *G01N 21/272* (2013.01); *G01N 21/7703* (2013.01); *G01N 2021/7779* (2013.01)

(58) Field of Classification Search
None
See application file for complete search history.

(56) References Cited

U.S. PATENT DOCUMENTS

| 5,866,430 A | 2/1999 | Grow | |
|---|---|---|---|
| 6,469,785 B1 * | 10/2002 | Duveneck | G01N 21/648 356/244 |

(Continued)

FOREIGN PATENT DOCUMENTS

| CN | 104115000 A | 10/2014 |
|---|---|---|
| EP | 2 693 164 A1 | 2/2014 |

(Continued)

OTHER PUBLICATIONS

Extended Search Report issued in European Application 16821150.6-1020 dated Nov. 7, 2018.

(Continued)

*Primary Examiner* — Paul S Hyun
(74) *Attorney, Agent, or Firm* — Xsensus LLP (57) ABSTRACT

Provided is a measuring chip, a measuring device and a measuring method, which are capable of performing a more simple and highly accurate measurement than the conventional measurement. Light introduced into an incoming part may propagate while totally reflecting within a propagating part of a propagation layer. A phase shift amount in the total internal reflection may be different between sections of an upper surface of the propagation layer where a ligand is formed and where a ligand is not formed. When an analyte is adsorbed to the ligand, the phase shift amount in the reflection may become larger than before attaching the analyte. As a result, a beam pattern of the light outputted from an outgoing part may change.

11 Claims, 10 Drawing Sheets

(56) References Cited

U.S. PATENT DOCUMENTS

| | | |
|---|---|---|
| 6,738,141 B1 | 5/2004 | Thirstrup |
| 2002/0025534 A1 | 2/2002 | Goh et al. |
| 2003/0049693 A1 | 3/2003 | Goh et al. |
| 2005/0135723 A1* | 6/2005 | Carr ................. G01N 21/45 385/12 |
| 2006/0216200 A1* | 9/2006 | Nagatomo ........... G01N 21/774 422/68.1 |
| 2011/0223679 A1 | 9/2011 | Cau et al. |
| 2014/0363901 A1 | 12/2014 | Fattinger |

FOREIGN PATENT DOCUMENTS

| | | |
|---|---|---|
| JP | 64-6842 A | 1/1989 |
| JP | 4-152249 A | 5/1992 |
| JP | 2002-536638 A | 10/2002 |
| JP | 2003-185569 A | 7/2003 |
| JP | 2003-528311 A | 9/2003 |
| JP | 2004-085437 A | 3/2004 |
| JP | 2005-502065 A | 1/2005 |
| JP | 2008-014732 A | 1/2008 |
| JP | 2012-502291 A | 1/2012 |
| WO | 03/023400 A2 | 3/2003 |
| WO | 2010/029139 A1 | 3/2010 |

OTHER PUBLICATIONS

Schmitt, K., et al., "Interferometric Biosensor based on Planar Optical Waveguide Sensor Chips for Label-Free Detection of Surface Bound Bioreactions", Biosensors and Bioelectronics, vol. 22, pp. 2591-2597 (Nov. 27, 2006).

Schneider, B.H., et al., "Hartman Interferometer: Versatile Integrated Optic Sensor for Label-Free, Real-Time Quantification of Nucleic Acids, Proteins, and Pathogens", Clinical Chemistry, vol. 43, No. 9, pp. 1757-1763, (1997).

International Search Report dated Aug. 9, 2016, in PCT/JP2016/066817 filed Jun. 7, 2016.

European Office Action dated Aug. 14, 2019 in European Application No. 16821150.6.

* cited by examiner

MEASURING CHIP, MEASURING DEVICE AND MEASURING METHOD

TECHNICAL FIELD

The present disclosure relates to a measuring chip, a measuring device and a measuring method.

BACKGROUND ART

Conventionally, as measuring devices which conduct genetic analysis, clinical diagnosis, or hazardous substance detection etc., a measuring device disclosed in Patent Document 1 is proposed, for example.

The measuring device of Patent Document 1 uses surface plasmon resonance and measures a change in a refractive index which occurs depending on whether a detected object is adsorbed.

REFERENCE DOCUMENT OF CONVENTIONAL ART

Patent Document

[Patent Document 1] JP2008-014732A

DESCRIPTION OF THE DISCLOSURE

Problems to be Solved by the Disclosure

However, in the measurement using the surface plasmon resonance, since a slight angular change (e.g., $\frac{1}{1000}$ degree) needs to be detected, it is required to perform a fine adjustment of an incoming angle and an outgoing angle of light. Additionally, since a resonance angle (or a resonance wavelength) changes due to a change of an ambient temperature, a fine temperature control is required. Therefore, an advanced angle detector and temperature controller are required, which make the device extremely expensive.

The present disclosure aims to provide a measuring chip, a measuring device and a measuring method, which are capable of performing a more simple and highly accurate measurement than the conventional measurement.

SUMMARY OF THE DISCLOSURE

The present disclosure may include an incoming part into which light is introduced, a propagating part where the light propagates, an outgoing part from which light is led out, and a reactor having a reactant that reacts with a to-be-detected substance, and configured to change a complex amplitude distribution in a direction perpendicular to a propagating direction of the light in the propagating part.

Light introduced into the incoming part may propagate while totally reflecting within a measuring chip. The reactor may change the complex amplitude distribution in the direction perpendicular to the propagating direction of the light according to a change in a complex refractive index of the vicinity of the propagating part due to a reaction between the to-be-detected substance and the reactant. For example, when the reactant (e.g., a ligand or a substrate which is breakable by enzyme) that reacts with the to-be-detected substance (analyte) is disposed in sections of an upper surface of the measuring chip where the density of the reactant varies in the perpendicular direction (e.g., the reactant is disposed in a stripe shape (partially)), the change of the complex amplitude distribution in the reflection (e.g., a phase shift amount or an amplitude change amount) may become different between a section where the density of the reactant is high and a section where the density of the reactant is low (or between a section where the reactant is formed or a section where the reactant is not formed).

For example, when the phase distribution changes as described above, the beam pattern of light emitted from the outgoing part may change (e.g., in a far field). For example, if a Gaussian beam is introduced into the incoming part, the light emitted from the outgoing part may result in diffracted lights. Further, when the to-be-detected substance is adsorbed to the reactant, the phase shift amount in the reflection may change. For example, an intensity of a first-order diffracted light may be higher with respect to an intensity of a zero-order diffracted light in the far field. Therefore, a measuring device may detect the presence of the to-be-detected substance or quantify it by detecting the change of the beam pattern of the led-out light.

Note that the reactor may be configured by the reactant formed periodically in the perpendicular direction. In this case, the reactant may be patterned on a main surface of the propagating part. Alternatively, the reactor may be configured by a concave and a convex formed in the main surface of the propagating part in the perpendicular direction. In this case, even when the reactant is formed on the entire surface, the surface area of the section where the concave and convex partially exist may become larger than that of the section where the concave and convex do not exist, and thus the adsorption amount of the to-be-detected substance may increase. Therefore, for example, the phase shift amount due to the adsorption of the to-be-detected substance may become larger in the section where the concave and convex exist than in the section where the concave and convex do not exist, and the beam pattern may change.

In addition, the reactor may be formed in the propagating direction of the light, reflect the light propagating the propagating part a plurality of times in the propagating direction to accumulate the change of the complex amplitude distribution. As the number of the reflections is larger, since the change of the complex amplitude distribution may become greater, the sensitivity may improve.

In addition, the reactor may be arranged in a stripe shape at a period of at least five times of a wavelength of the light. When the period of the reactor is sufficiently longer than the wavelength of the light, countless diffracted lights may be generated, which results in suitable diffracted lights.

In addition, the reactor may be in a mode where it is formed on one of opposing surfaces of the measuring chip (propagating part) or a mode where it is formed on both surfaces of the measuring chip.

Effect of the Disclosure

According to the present disclosure, a measuring chip, a measuring device and a measuring method, which are capable of performing a more simple and highly accurate measurement than the conventional measurement, may be provided.

BRIEF DESCRIPTION OF DRAWINGS

FIGS. 3(A) to 3(E) are views illustrating a structure of a chip 1.

FIGS. 4(A) to 4(E) are charts illustrating a relationship between an intensity and a phase of light.

MODES FOR CARRYING OUT THE DISCLOSURE

Figure 1:
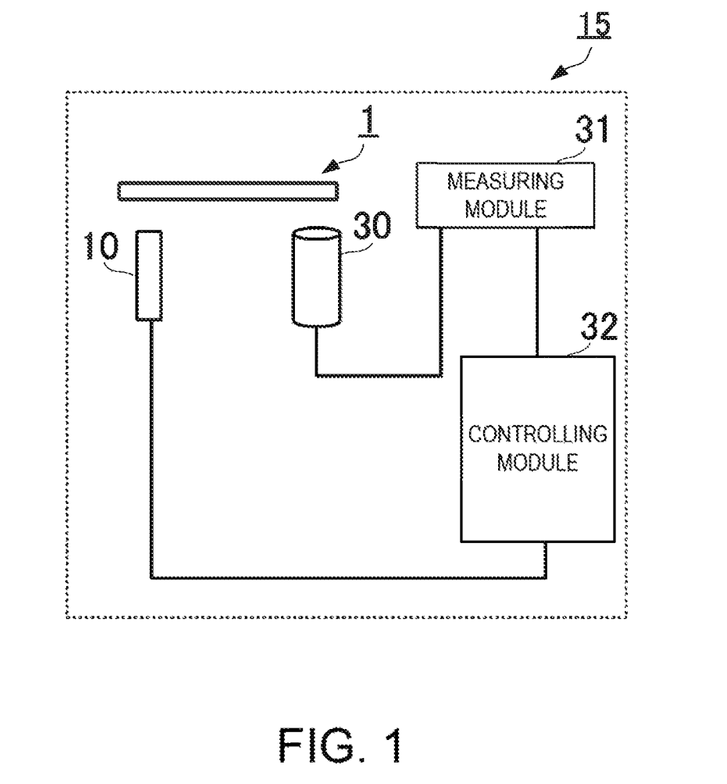
FIG. 1 is a view illustrating a schematic configuration of a measuring device 15.
Figure 2:
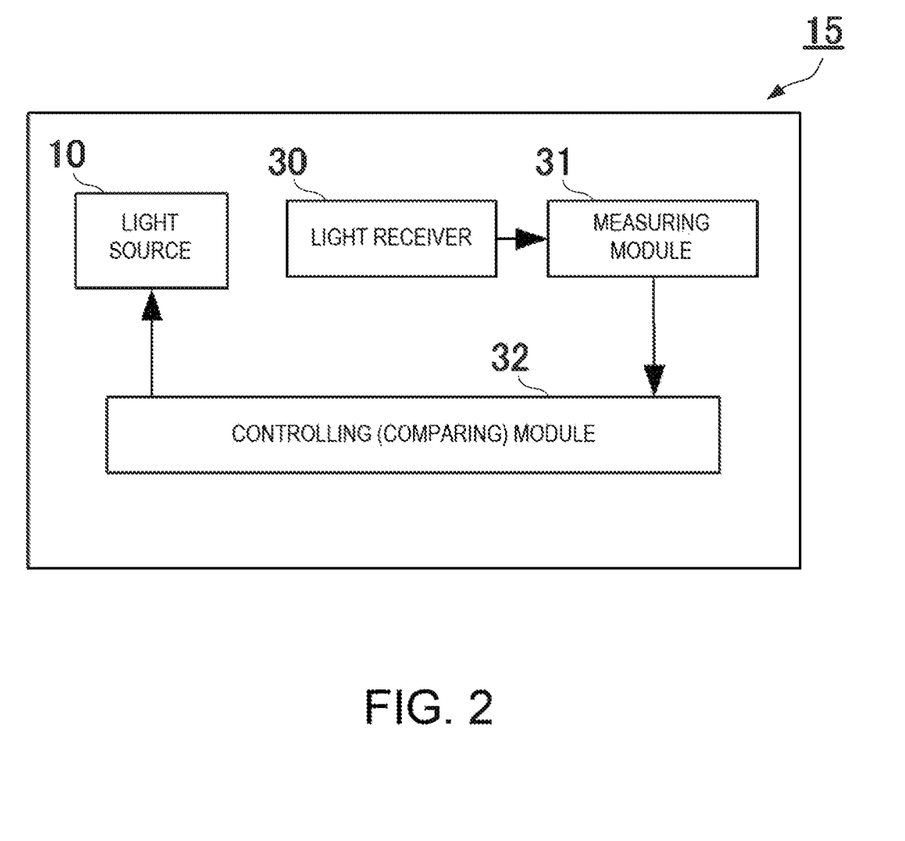
FIG. 2 is a block diagram illustrating a configuration of the measuring device 15.

FIG. 1 is a view illustrating a schematic configuration of a measuring device 15 including a chip of the present disclosure. FIG. 2 is a block diagram illustrating a configuration of the measuring device 15. FIGS. 3(A) to 3(E) are views illustrating a structure of the chip 1.

As illustrated in FIG. 1, the measuring device 15 may include a chip (measuring chip) 1, a light source 10, a light receiver 30, a measuring module 31 and a controlling module (comparing module) 32. The measuring module 31 and the controlling module 32 may be exclusive hardware, or a mode in which they are achieved by software installed in an information processing device, such as a personal computer, may be adopted.

The light source 10 may emit visible light of about 650 nm, for example. The light may be emitted to an incoming part 11 of the chip 1. The light emitted from the light source 10 may be a Gaussian beam. The Gaussian beam does not change in shape in the process of propagation, therefore it may be suitable to detect a change of a beam shape. Further, the light emitted from the light source 10 may be a continuous wave (CW). By adopting the continuous wave, the observation may become easy and the light source may also be reduced in cost. Note that the Gaussian beam may not need to have a two-dimensional Gaussian distribution but may have a Gaussian distribution in an X-direction illustrated in FIG. 3. Further, although the light emitted from the light source 10 may not be limited to visible light, particularly when using visible light, since a relatively expensive light source or measuring module of, for example, infrared light or ultraviolet light is not used, a cost of the measuring device may be reduced.

FIG. 3(A) is a cross-sectional view of the chip 1, and FIGS. 3(B) and 3(C) are perspective views illustrating a structure of the chip 1. In this example, an upper surface direction (thickness direction) of the chip 1 is Z, a propagating direction (length direction) of light is Y, and a width direction perpendicular to the propagating direction of light is X.

The chip 1 may be comprised of a flat-plate-shaped propagation layer 101. The propagation layer 101 may adopt acrylic resin having a refractive index of about 1.5. Additionally, the propagation layer 101 may adopt a dielectric body, such as glass, polyvinyl alcohol, polyvinyl chloride, silicone resin, polystyrene etc.

As one example, the propagation layer 101 may have a thickness of 0.1 mm, a length in the Y-direction of 15 mm, and a length in the X-direction of about 2 mm.

A lower-side main surface of the propagation layer 101 may be provided with the incoming part 11 and an outgoing part 17. The incoming part 11 and the outgoing part 17 may be comprised of a diffraction grating. For example, the diffraction grating may be formed by a nano-imprint method. The nano-imprint method may include preparing a casting mold such as metal with patterning of a stripe-shape structure, and transferring the pattern on the propagation layer 101. Additionally, the incoming part 11 and the outgoing part 17 may also be provided by prism.

The light introduced into the incoming part 11 may be totally reflected on an upper surface and a lower surface of the propagation layer 101. In the propagation layer 101, the section of this total internal reflection may be referred to as a propagating part 13. The light propagated the propagating part 13 may be emitted from the outgoing part 17.

As illustrated in FIG. 3(B), an upper-side main surface of the propagation layer 101 may be formed with a ligand 102. As illustrated in FIG. 3(C), the ligand 102 may be a substance which specifically adsorbs an analyte (to-be-detected substance) 201 within a specimen. In this example, a plurality of ligands 102 may be formed periodically in a direction perpendicular to the propagating direction of light (Y-direction), i.e., in the X-direction. Further, each ligand 102 may be formed entirely in the Y-direction. The ligand 102 may be disposed, for example, by applying a surface treatment agent for adsorbing the ligand after patterning a resist, and then removing the resist. In one example, the ligand 102 may have a width (the length in the X-direction) of about 0.1 mm and a thickness of about 5 nm.

Figure 4A:
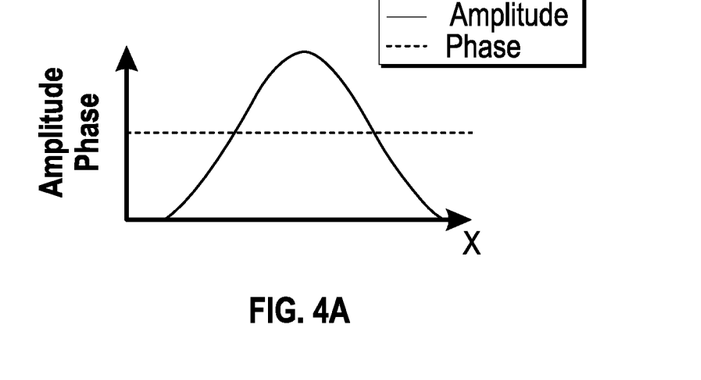

The ligand 102 arranged as described above may function as a reactor which changes a complex amplitude distribution of propagated light in the X-direction (e.g., a phase distribution, an amplitude distribution, or both) according to a change in a complex refractive index of the vicinity of the propagation layer 101 (in this embodiment, on the upper surface of the propagation layer 101) caused by a reaction between the analyte and the ligand. Note that, to simplify the description, the reactor may be described as having a function of changing only the phase distribution of light in the X-direction in this embodiment. FIGS. 4(A) to 4(E) are charts illustrating the amplitude and phase of light. FIG. 4(A) is a view illustrating the amplitude (intensity) and phase of the light introduced into the incoming part 11. In this example, the light introduced into the incoming part 11 may be a Gaussian beam, have a substantially equal phase in the X-direction, and have a constant beam shape during the propagation process.

The light introduced into the incoming part 11 may propagate while totally reflecting within the propagating part 13 of the propagation layer 101. Here, the refractive index of the ligand 102 (e.g., about 1.5) may be different from a refractive index of the vicinity thereof (e.g., a specimen with a refractive index of 1.33 or air with a refractive index of 1). The phase shift amount in the total internal reflection may depend on the refractive index of the propagating part 13 and the magnitude of the refractive index of the vicinity which is in contact with the propagating part 13. Therefore, the phase shift amount in the total internal reflection may become different between a section where the ligand 102 is formed and a section where the ligand 102 is not formed. That is, in FIG. 3(B), the magnitude of the refractive index of the vicinity may be constant, and structurally, FIG. 3(B) may be equivalent to a propagation layer 101 of which section where the ligand 102 is formed has an upward-convex shape as illustrated in FIG. 3(D), in that the phase distribution varies.

Figure 4B:
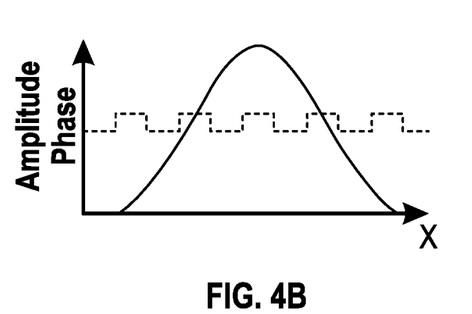

Thus, as illustrated in FIG. 4(B), in the light propagating the propagating part 13, the phase distribution in the X-direction may change. As the number of reflections increases, the change of the phase distribution may be accumulated and the phase shift amount may increase.

Figure 4C:
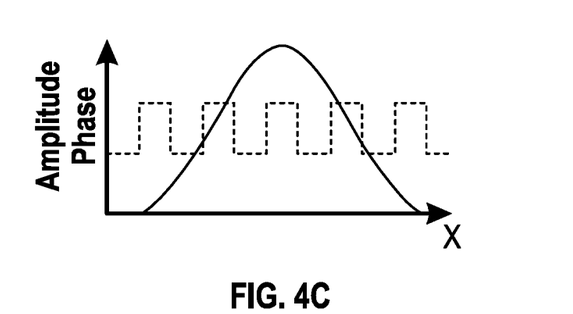
Figure 4D:
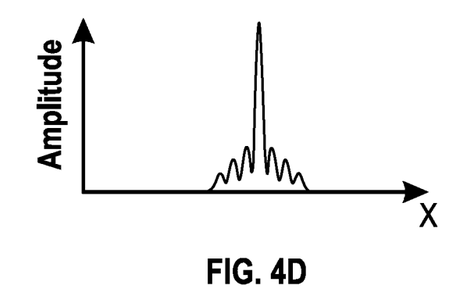

Further, when the period (pitch) at which each ligand 102 is formed is sufficiently longer than (e.g., 5 times or more) a wavelength of light, as illustrated in FIG. 4(D), the light emitted from the outgoing part 17 may result in a large number of diffracted lights in a far field, for example. By making the period five times or more, the chip 1 may be manufactured relatively easily.

Figure 3:
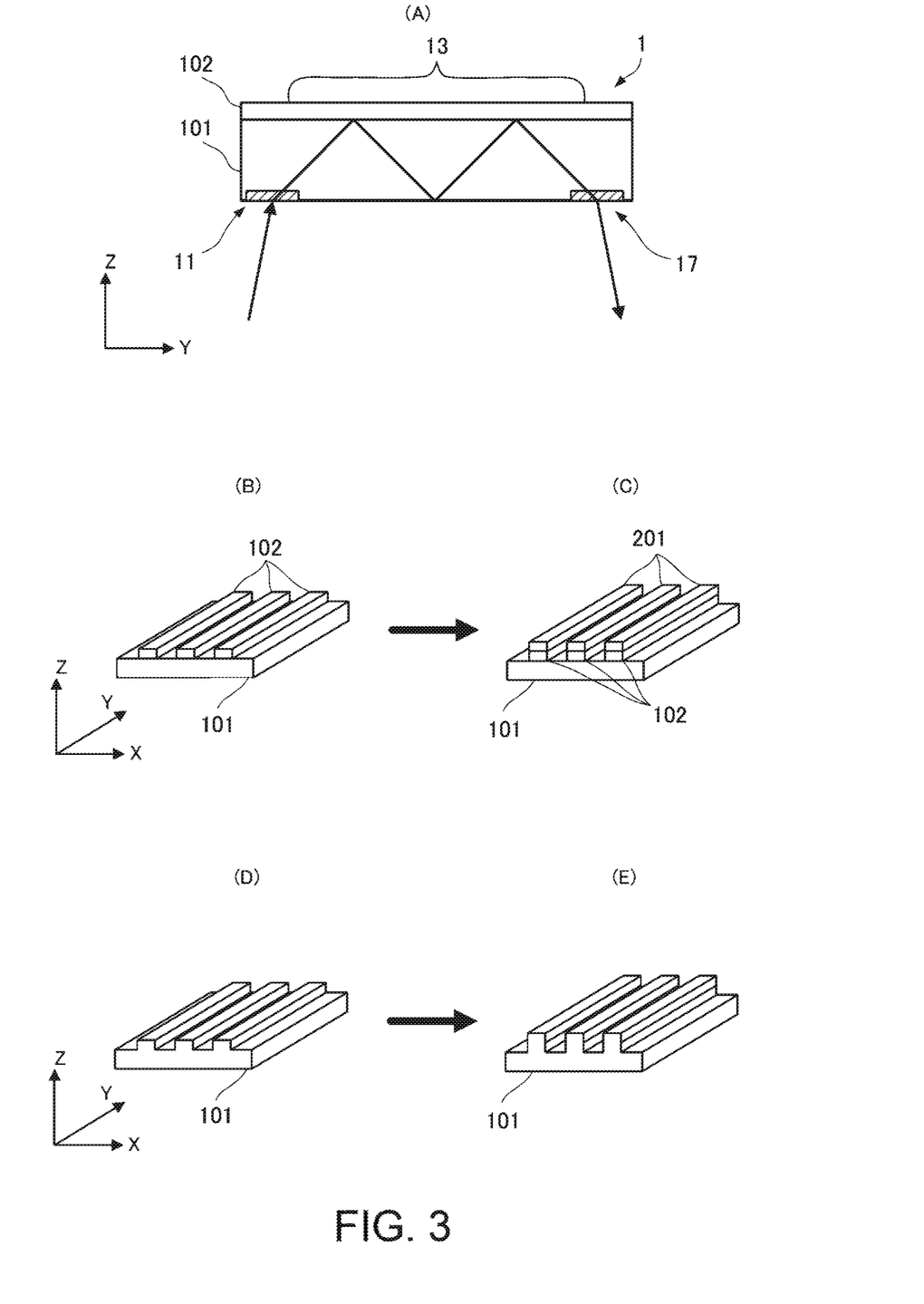
Figure 4E:
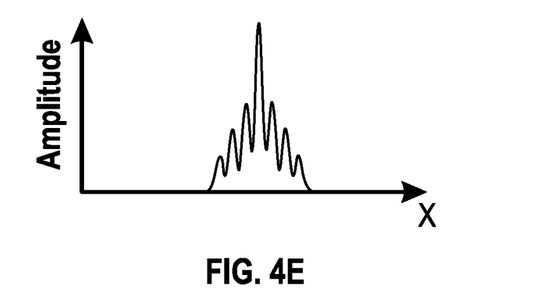

Here, as illustrated in FIG. 3(C), when the analyte 201 having substantially the same refractive index as the ligand 102 is adsorbed to the ligand 102, as illustrated in FIG. 4(C), the phase shift amount in the reflection may become larger than before attaching the analyte 201. That is, the magnitude of the refractive index may be constant, and structurally, FIG. 3(C) may be equivalent to a state where the convex portion of the upper surface becomes taller as illustrated in FIG. 3(E). As a result, as illustrated in FIG. 4(E), the beam pattern of the light outputted from the outgoing part 17 may change.

In this example, the intensity of a first-order diffracted light may be higher with respect to the intensity of a zero-order diffracted light. Therefore, before and after the chip 1 contacts (is attached to) the specimen, the measuring device 15 may receive light emitted from the outgoing part 17 by the light receiver 30 in the far field (or through a Fourier transform lens), the measuring module 31 may measure the intensity of the zero-order diffracted light and the intensity of the first-order diffracted light. The intensities measured by the measuring module 31 may be inputted to the controlling module 32 and stored in a memory (not illustrated). The measuring module 31 may calculate the intensity of the first-order diffracted light with respect to the intensity of the zero-order diffracted light, and when a change of the intensity of the first-order diffracted light with respect to the intensity of the zero-order diffracted light is greater than a given value, determine that the analyte exists. Alternatively, the measuring module 31 may quantify the analyte based on the change of the intensity of the first-order diffracted light with respect to the intensity of the zero-order diffracted light.

In this manner, the measuring device 15 may function as a detection device configured to detect the presence or concentration of the analyte (e.g., an antigen such as an influenza virus).

Figure 5:
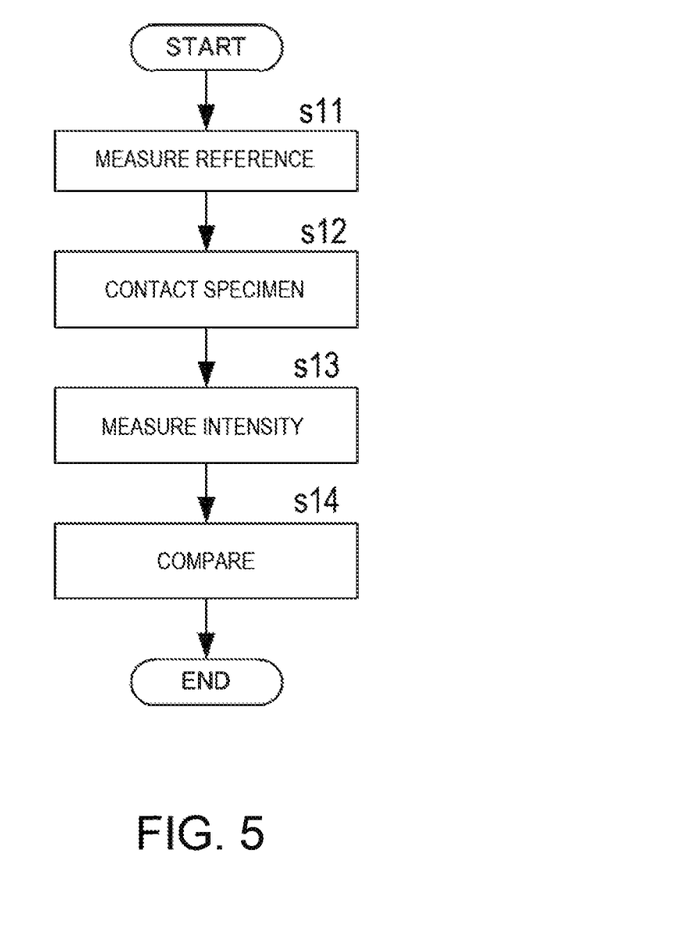
FIG. 5 is a flowchart illustrating a measuring method.

Next, FIG. 5 is a flowchart of a measuring method. First, the measuring device 15 may measure a reference intensity in a state where the analyte 201 is not adsorbed to the ligand 102 (s11: corresponding to a first measuring step). The reference measurement may be performed, for example, in a state after the chip 1 is washed with a cleaning solution (e.g., pure water) and dried, or may be performed in a state where the cleaning solution is attached to the upper surface of the chip 1.

As illustrated in FIG. 1, the measuring device 15 may be designed such that the chip 1 is installed at a given location, and light of the light source 10 is introduced into the incoming part 11 from the lower surface of the chip 1. The light receiver 30 may receive the light emitted from the outgoing part 17 and be comprised of light receiving elements arranged one-dimensionally or two-dimensionally. The measuring module 31 may acquire intensity information of the light received by each light receiving element of the light receiver 30 and output it to the controlling module 32. In order to analyze the beam pattern of the light received by the light receiver 30, the controlling nodule 32 may store, as the beam pattern, the intensity information of each light receiving element acquired by the measuring module 31 in the built-in memory (not illustrated).

Then, the specimen including the analyte which is a detection target may be attached to the upper surface of the chip 1 (s12: corresponding to a contacting step). Further, the measuring device 15 may introduce light to the incoming part 11 of the chip 1 in the state where the specimen is attached thereto, and measure the beam pattern of the light emitted from the outgoing part 17 (s13: corresponding to a second measuring step).

Then, the controlling module 32 may compare a reference beam pattern stored in the memory with a beam pattern in a state after the specimen is brought into contact (s14: corresponding to a detecting step). For example, the controlling module 32 may calculate the intensity of the first-order diffracted light with respect to the intensity of the zero-order diffracted light, and when a change of the intensity of the first-order diffracted light with respect to the intensity of the zero-order diffracted light is greater than the given value, determine that the analyte exists. Alternatively, the controlling module 32 may quantify the analyte based on the change of the intensity of the first-order diffracted light with respect to the intensity of the zero-order diffracted light.

In this manner, the measuring device 15 may detect the presence of the analyte or quantify it.

In the measuring method of this embodiment, by changing the length of the chip 1 in the Y-direction, the number of reflections may be adjusted and the sensitivity may be changed. For example, since the number of reflections increases as the chip 1 becomes longer in the Y-direction, the sensitivity may improve.

Further, since the measuring method described in this embodiment may be executed even without washing and drying the specimen, a prompt detection may be achieved and the detection may be performed even in an environment where there is no cleaning solution.

Moreover, even if the amplitude of the light source changes, since a ratio between the intensity of the zero-order diffracted light and the intensity of the first-order diffracted light does not change, a stable measurement may be performed. Furthermore, the phase shift amount in the total internal reflection may be scarcely influenced by a temperature change, and a change of the phase amount shift due to a change of the incident angle may also be extremely small. Therefore, in the measuring method described in this embodiment, an advanced angle detector and temperature controller may be unnecessary, and a simple and highly accurate detection may be achieved.

Figure 6:
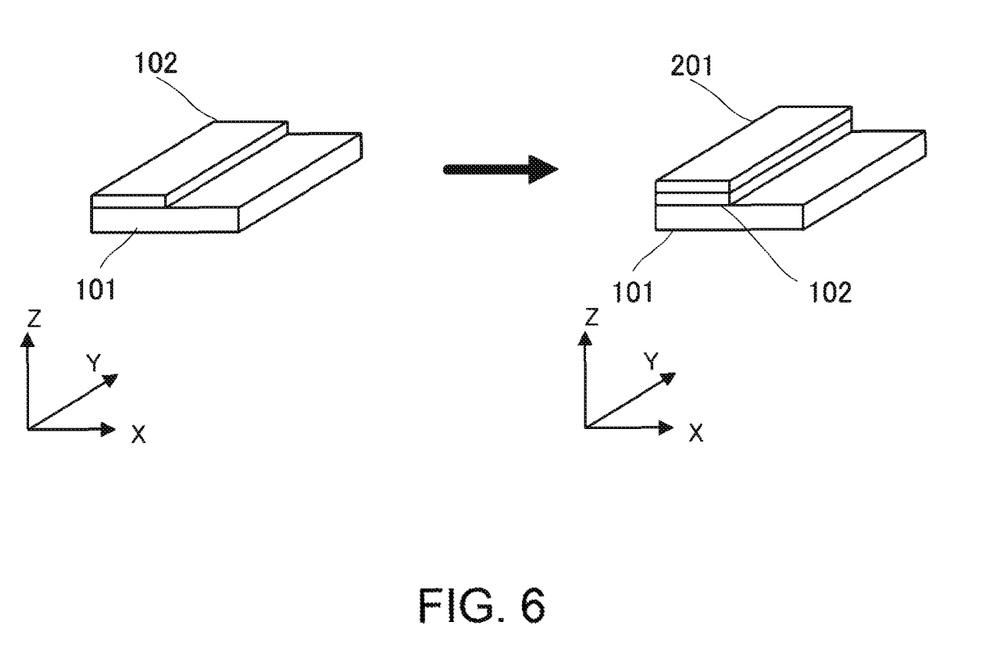
FIG. 6 is a view illustrating a structure of the chip 1 in a case of forming a ligand only in a single section.

Note that, although FIG. 3 illustrates the example in which the three ligands 102 are formed periodically as one example of arranging a section with a high ligand density and a section with a low ligand density, the number of formed ligands 102 may not be limited to three. For example, in the simplest case, as illustrated in FIG. 6, the section where the ligand 102 is formed and the section where the ligand 102 is not formed may be configured by bringing the center of the beam as a boundary. Even with such a structure, since the ligand 102 may function as the reactor which changes the phase distribution of the propagated light in the X-direction, it is possible to detect a change in the beam pattern.

Figure 7:
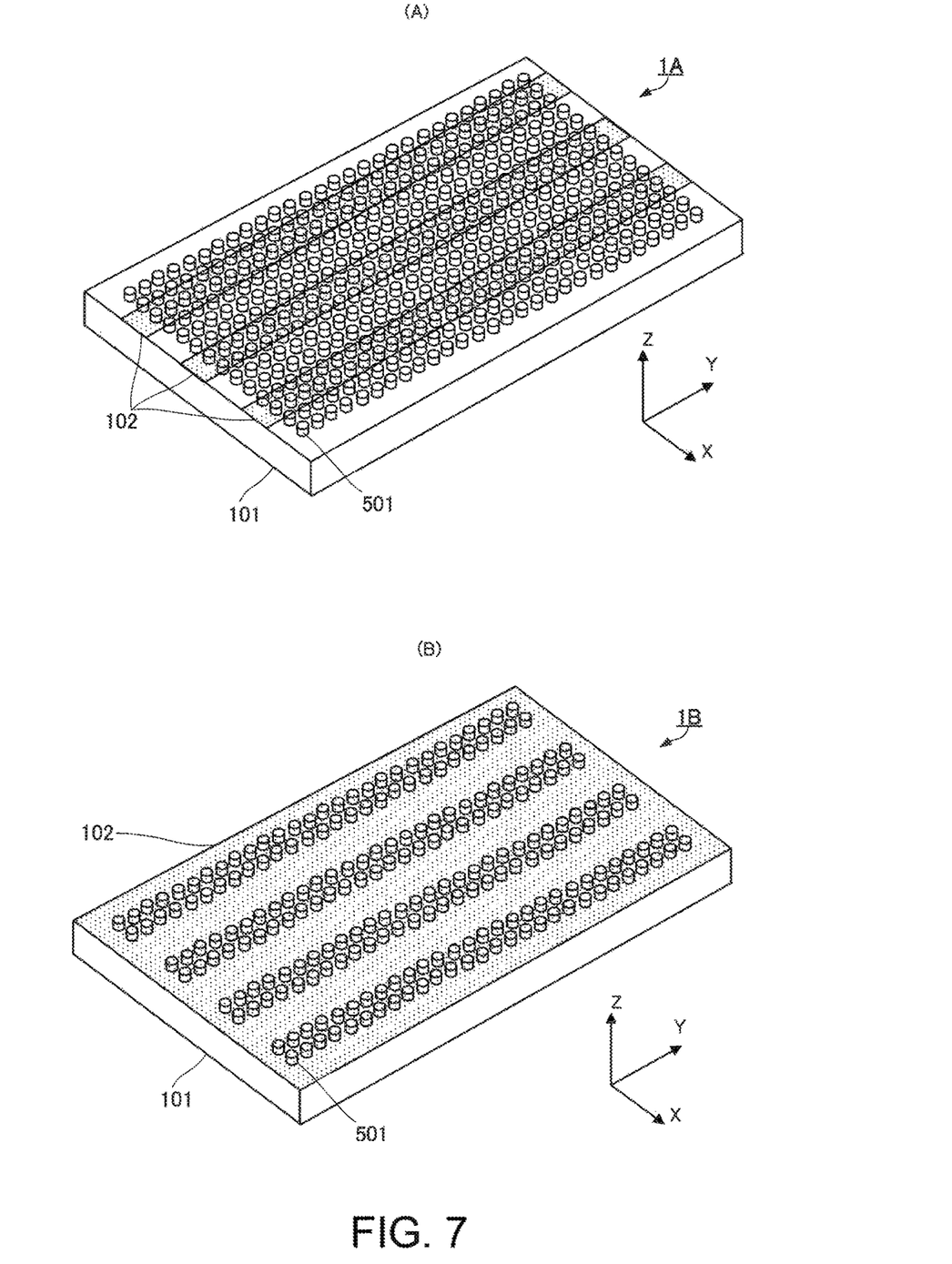
FIG. 7(A) is a perspective view of a chip 1A according to an application example 1.
FIG. 7(B) is a perspective view of a chip 1B according to an application example 2.

Next, FIG. 7(A) is a perspective view of a chip 1A according to an application example 1. In the chip 1A, a plurality of fine-convex-shaped circular-cylindrical structures 501 may be periodically arranged at a given pitch on the upper surface of the propagation layer 101. These circular-cylindrical structures 501 may be formed by, for example, the nano-imprint method. The circular-cylindrical structures 501 may be periodically arranged at a pitch of about 100 nm, for example. Since the arrangement pitch of the structures 501 may be sufficiently smaller than the wavelength of light (e.g., 650 nm), the propagation light may not diffract by the periodic arrangement of the circular-cylindrical structures.

By providing such a fine periodic structure, the chip 1A may have a larger surface area of the propagation layer 101 and a larger surface area of the ligands 102 than those of the chip 1. Therefore, the phase shift amount when the analyte 201 is attached may be increased and the sensitivity may improve.

FIG. 7(B) is a perspective view of a chip 1B according to an application example 2. In the chip 1B, the ligand 102 may be applied entirely to the upper surface of the propagation layer 101.

In the chip 1B, the circular-cylindrical structures 501 may be periodically arranged at a given pitch on the upper surface of the propagation layer 101. Note that, on the upper surface of the propagation layer 101, a section where the circular-cylindrical structures 501 are provided and a section where the circular-cylindrical structure 501 is not provided may be located periodically in the X-direction.

Since the surface area of the section where the circular-cylindrical structures 501 are provided becomes larger than that of the section where the circular-cylindrical structure 501 is not provided, the phase shift amount when the analyte 201 is attached may increase. That is, in this example, the circular-cylindrical structure 501 formed in a part of the surface of the propagating part 13 in the X-direction may function as a reactor which changes the phase distribution of the propagating light in the X-direction. Therefore, even when the ligand 102 is applied entirely to the surface, the beam pattern may be changed.

Note that, although in FIGS. 7(A) and 7(B) a convex-shaped circular-cylindrical structure is illustrated on the upper surface of the propagation layer 101 as a fine periodic structure, a concave-shaped circular-cylindrical structure may be provided.

Figure 8:
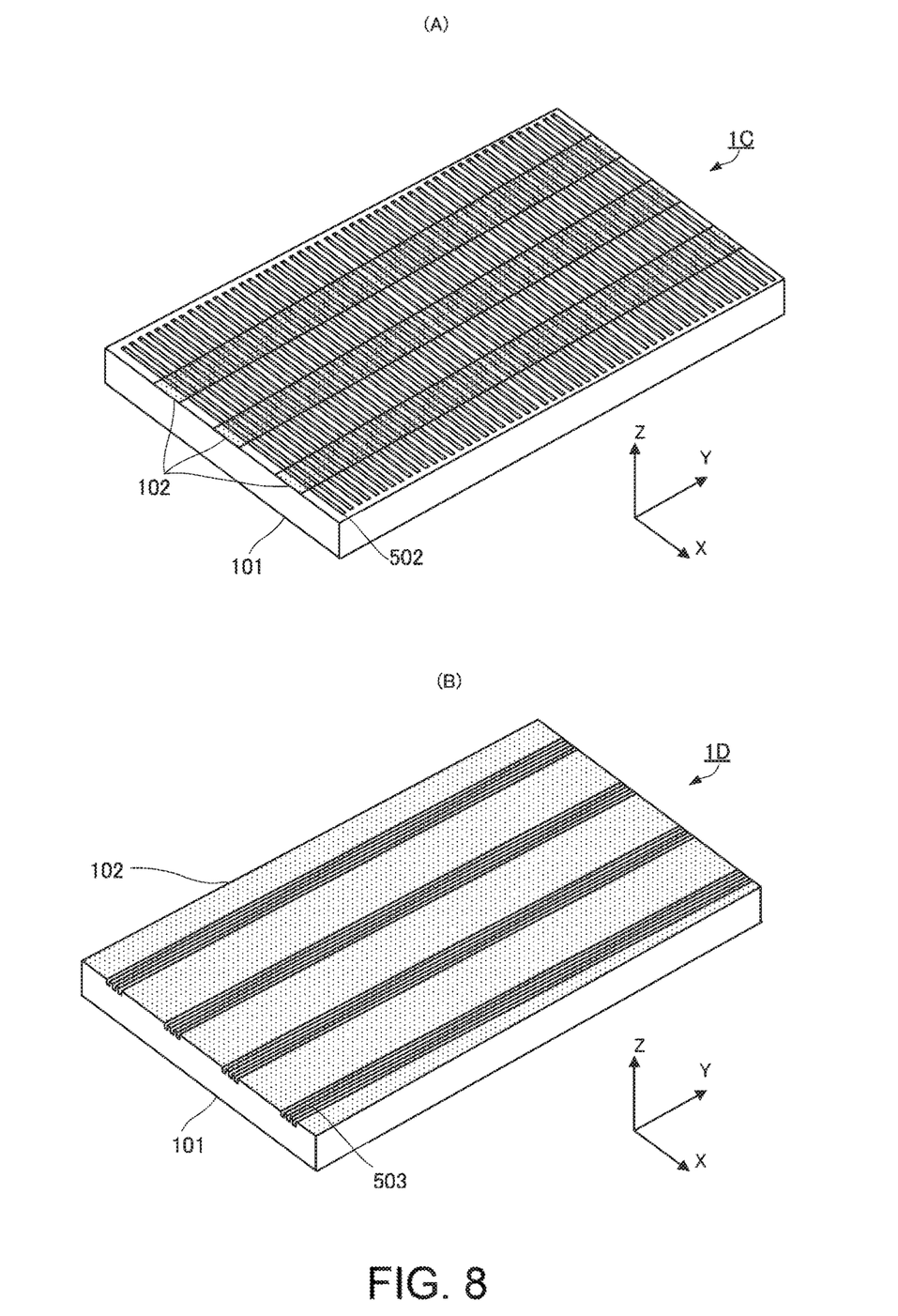
FIG. 8(A) is a perspective view of a chip 1C and FIG. 8(B) is a perspective view of a chip 1D.

Further, as illustrated in a chip 1C of FIG. 8(A), the surface area may also be increased by forming fine grooves 502 which are longer in the X-direction and shorter in the Y-direction (having a width sufficiently shorter than the wavelength of light) periodically in the Y-direction, and the sensitivity may improve.

Further, instead of the circular-cylindrical structure 501 illustrated in FIG. 7(B), as illustrated in a chip 1D of FIG. 8(B), fine grooves 503 which are longer in the Y-direction and shorter in the X-direction may be arranged periodically at a given pitch. In this case, on the upper surface of the propagation layer 101, a section where the grooves 503 are formed and a section where the groove 503 is not formed may exist periodically in the X-direction. In this example, the section where the grooves 503 are formed and the section where the groove 503 is not formed may be formed in the propagating direction of light and function as a reactor which changes the phase distribution of the propagating light in the X-direction.

Figure 9:
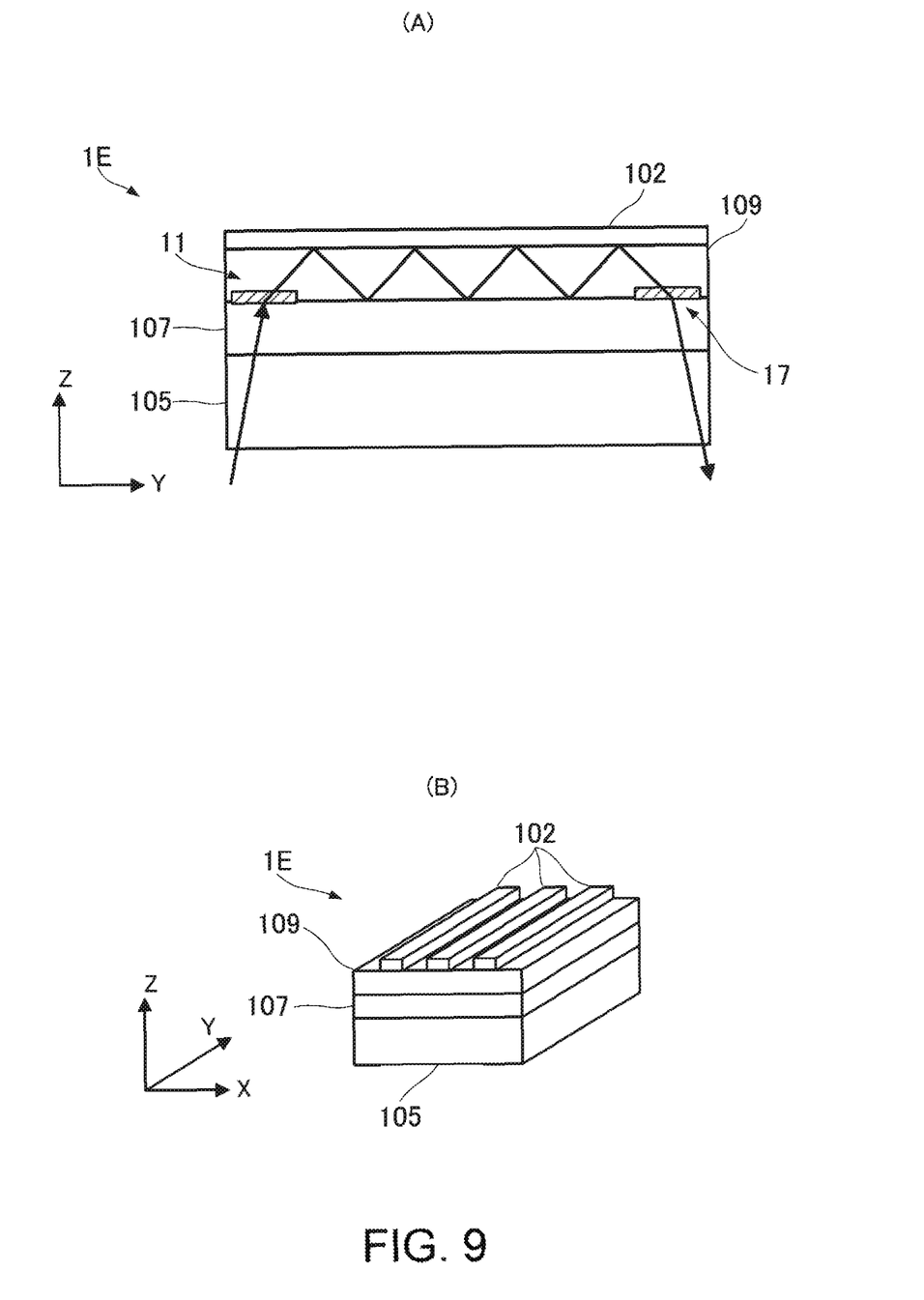
FIGS. 9(A) and 9(B) are views illustrating a chip 1E according to an application example 3.

FIGS. 9(A) and 9(B) are a cross-sectional view and a perspective view of a chip 1E according to an application example 3. In the chip 1E, a propagation layer 109 is formed on an upper surface of a base member 105 such as glass, via an intermediate layer 107. The intermediate layer 107 may adopt a material having a refractive index substantially the same as the specimen (e.g., a Fluororesin material with a refractive index of about 1.34). An upper surface of the propagation layer 109 may be formed with the ligand 102. The formation mode of the ligand 102 may be similar to that in the chip 1.

In the chip 1E, the propagation layer 109 may be thinner than the propagation layer 101. For example, the propagation layer 109 may be thinned to about a several µm since the base member 105 of about 0.1 mm thickness maintains the shape.

Since the number of reflections increases as the propagation layer becomes longer in the Y-direction and shorter in the Z-direction, the sensitivity may improve. However, if the length in the Y-direction is extended, a larger amount of specimens may be needed to be attached to the chip. Thus, the chip 1E of the application example 3 may be in a mode where some level of sensitivity is secured by thinning the section where the total internal reflection occurs down to a several µm, even when the length in the Y-direction is shortened (e.g., 1 mm or below).

Further, although the intermediate layer 107 is not essential, since the refractive index of glass becomes high without the intermediate layer 107 (e.g., from about 1.5 to 1.6), an incident angle may become shallower and the reflection number reduces and, additionally, the phase shift amount in the reflection may also become small.

For this reason, in the application example 3, by disposing the intermediate layer 107 having substantially the same refractive index (e.g., 1.34) as that of the specimen (e.g., 1.33) on a lower surface of the propagation layer 109, the total internal reflection may suitably be performed even on the lower surface side of the propagation layer 109 with a sharp incident angle.

Figure 10:
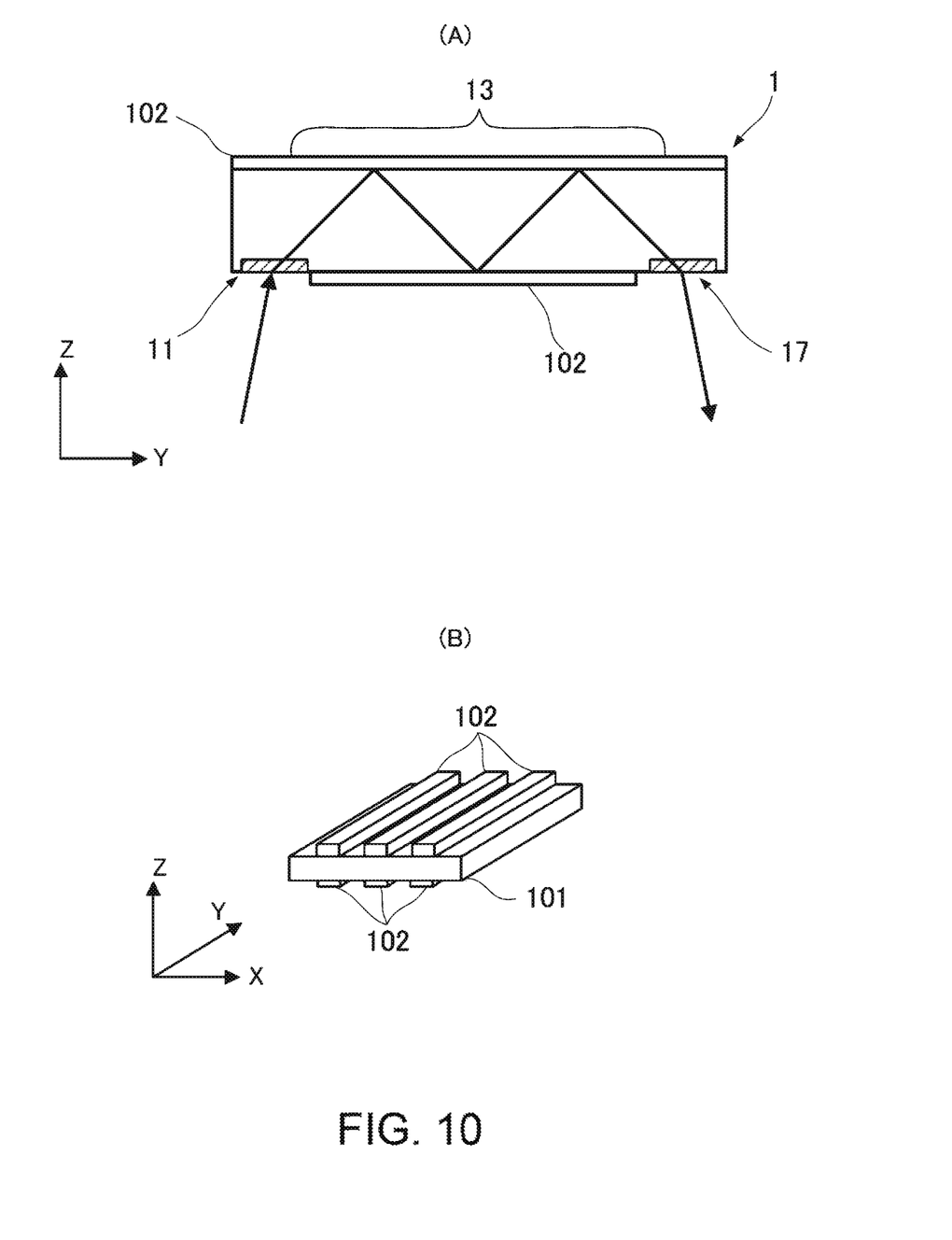
FIGS. 10(A) and 10(B) are views illustrating one example in which the ligand is formed on both main surfaces.

Note that, although in this embodiment the example in which the ligand is formed on the upper surface of the propagation layer is described, for example, as illustrated in FIGS. 10(A) and 10(B), such a chip that the ligand 102 is formed on the upper and lower surfaces of the propagation layer (note that, in the section other than the incoming part 11 and the outgoing part 17 for the lower surface) may be adopted.

Moreover, although in this embodiment, the reactant is comprised of the ligand, the present disclosure is not limited to this, and it may be a substrate which is breakable by enzyme. Also in this case, it is needless to say that the phase shift amount in the total internal reflection may be different between a section where the substrate is formed and a section where the substrate is not formed.

Moreover, in the configuration of this embodiment, the reactor may have a function of changing only the phase distribution in the direction perpendicular to the propagating direction of light in the propagating part. However, the present disclosure is not limited to this, a configuration may be adopted, in which the reactor has a function of changing only the amplitude distribution in the direction perpendicular to the propagating direction of light in the propagating part or the reactor has a function of changing both the phase distribution and the amplitude distribution in the direction perpendicular to the propagating direction of light in the propagating part.

DESCRIPTION OF REFERENCE CHARACTERS 1, 1A, 1B, 1C, 1D, 1E Chip
10 Light Source
11 Incoming Part
13 Propagating Part
15 Measuring Device 17 Outgoing Part
30 Light Receiver
31 Measuring Module
32 Controlling Module
101 Propagation Layer
102 Ligand
105 Base Member
107 Intermediate Layer
109 Propagation Layer
201 To-be-detected Substance (Analyte)
501 Circular-cylindrical Structure
502, 503 Groove

The invention claimed is:

1. A measuring chip, comprising:
   a propagation layer having an incoming part into which light is introduced, a propagating part where the light propagates, and an outgoing part from which light is led out; and
   an arrangement of reactant that reacts with a to-be-detected substance and is configured to change a complex amplitude distribution of the light in a direction perpendicular to a propagating direction of the light in the propagating part,
   wherein the arrangement of reactant has a first section and a second section, wherein the density of the reactant between the first section and the second section varies in the direction perpendicular to the propagating direction of the light.

2. The measuring chip of claim 1, wherein the arrangement of reactant changes the complex amplitude distribution of the light in the direction perpendicular to the propagating direction of the light according to a change m a complex refractive index of the vicinity of the propagating part due to a reaction between the to-be-detected substance and the arrangement of reactant.

3. The measuring chip of claim 1, wherein the arrangement of reactant has a section where the reactant is formed in a part of a surface of the propagatin part in the perpendicular direction.

4. The measuring chip of claim 1, wherein the arrangement of reactant has a section where a convex portion is formed in a part of a surface of the propagating part in the perpendicular direction.

5. The measuring chip of claim 1, wherein the arrangement of reactant is formed in the propagating direction of the light, and
   wherein the arrangement of reactant changes the reflection of the light propagating in the propagating part of the propagation layer a plurality of times in the propagating direction, which changes the complex amplitude distribution of the light.

6. The measuring chip of claim 1, wherein the propagation layer includes opposing main surfaces, and the arrangement of reactant: is formed on both main surfaces.

7. A measuring device in which the measuring chip of claim 1 is disposed, comprising:
   a light source configured to guide the light to the incoming part of the measuring chip;
   a light receiver configured to receive light emitted from the outgoing part; and
   a controlling module configured to analyze a beam pattern of the light received by the light receiver.

8. The measuring device of claim 7, wherein the light is a Gaussian beam.

9. The measuring device of claim 7, wherein the controlling module performs detection processing in which a change of the beam pattern of the light is detected.

10. The measuring device of claim 7, wherein the controlling module performs detection processing in which an intensity of a, zero-order diffracted light and an intensity of a first-order diffracted light of the beam pattern of the light are detected.

11. A measuring method using the measuring chip of claim 1 comprising:
    introducing light into the incoming part of the propagation layer and detecting a first beam pattern of the light emitted from the outgoing part of the propagation layer;
    bringing a specimen including a to-be-detected substance into contact with the measuring chip;
    detecting a second beam pattern of light emitted from the outgoing pan of the propagation layer after the specimen including the to-be-detected substance is brought into contact;
    comparing an intensity of a zero-order diffracted light and an intensity of a first-order diffracted light in each of the first and second detected beam patterns; and
    detecting a change between the detected first and second beam patterns based on the comparison.

* * * * *